US007403893B2

(12) United States Patent
Huart et al.

(10) Patent No.: US 7,403,893 B2
(45) **Date of Patent: *Jul. 22, 2008**

(54) METHOD AND APPARATUS FOR RECONSTRUCTING VOICE INFORMATION

(75) Inventors: Pascal H. Huart, Dallas, TX (US); Luke K. Surazski, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/336,742

(22) Filed: Jan. 19, 2006

(65) Prior Publication Data

US 2006/0122835 A1 Jun. 8, 2006

Related U.S. Application Data

(62) Division of application No. 09/918,150, filed on Jul. 30, 2001, now Pat. No. 7,013,267.

(51) Int. Cl.
*G10L 11/00* (2006.01)
*H04L 1/08* (2006.01)
*H04L 1/22* (2006.01)

(52) U.S. Cl. ....................... 704/207; 704/215; 704/217; 714/747; 714/822

(58) Field of Classification Search ................. 704/206, 704/207, 210, 215, 217, 225, 226, 228, 278; 714/6, 747, 819, 822
See application file for complete search history.

(56) References Cited

U.S. PATENT DOCUMENTS

| | | | | |
|---|---|---|---|---|
| 4,907,277 | A | 3/1990 | Callens et al. | |
| 5,450,449 | A | 9/1995 | Kroon | |
| 5,699,478 | A | 12/1997 | Nahumi | |
| 5,699,485 | A | 12/1997 | Shoham | |
| 5,870,397 | A * | 2/1999 | Chauffour et al. | 370/435 |
| 5,884,010 | A | 3/1999 | Chen et al. | |
| 5,943,347 | A | 8/1999 | Shepard | |
| 6,356,545 | B1 | 3/2002 | Vargo et al. | |
| 6,389,006 | B1 | 5/2002 | Bialik | |
| 6,445,717 | B1 * | 9/2002 | Gibson et al. | 370/473 |
| 6,584,438 | B1 * | 6/2003 | Manjunath et al. | 704/228 |
| 6,665,637 | B2 | 12/2003 | Bruhn | |
| 6,687,360 | B2 | 2/2004 | Kung et al. | |
| 6,725,191 | B2 * | 4/2004 | Mecayten | 704/215 |
| 6,757,654 | B1 | 6/2004 | Westerlund et al. | |
| 6,785,261 | B1 * | 8/2004 | Schuster et al. | 370/352 |
| 6,836,804 | B1 * | 12/2004 | Jagadeesan | 709/236 |

(Continued)

OTHER PUBLICATIONS

Hayashi, Recommendation G.711—Appendix I, "A High Quality Low-Complexity Algorithm for Packet Loss Concealment with G.711," Temporary Document 10 (PLEN), *ITU—Telecommunication Standardization Sector*, Sep. 1999, 19 pages.

(Continued)

*Primary Examiner*—Martin Lerner
(74) *Attorney, Agent, or Firm*—Baker Botts L.L.P.

(57) ABSTRACT

A communication system includes a destination that receives voice samples and a voice parameter generated by a source. The destination uses the voice samples and voice parameter to reconstruct voice information in response to a packet loss. The destination may reconstruct voice information from multiple sources.

33 Claims, 4 Drawing Sheets

U.S. PATENT DOCUMENTS

| | | | | |
|---|---|---|---|---|
| 7,013,267 | B1 * | 3/2006 | Huart et al. | 704/207 |
| 7,039,716 | B1 * | 5/2006 | Jagadeesan | 709/236 |
| 7,047,190 | B1 * | 5/2006 | Kapilow | 704/228 |
| 7,099,820 | B1 * | 8/2006 | Huart et al. | 704/207 |
| 7,212,517 | B2 * | 5/2007 | Dzik | 370/352 |

OTHER PUBLICATIONS

Liao et al., "Adaptive recovery techniques for real-time audio streams," IEEE Infocom 2001. Twentieth Annual Joint Conference of the IEEE Computer and Communications Societies Proceedings. Apr. 22-26, 2001, vol. 2, pp. 815-823.

Goodman et al., "Waveform substitution techniques for recovering missing speech segments in packet voice communications," IEEE Transactions on Acoustics, Speech and Signal Processing, Dec. 1986, vol. 34, Issue 6, pp. 1440-1448.

* cited by examiner

METHOD AND APPARATUS FOR RECONSTRUCTING VOICE INFORMATION

CROSS-REFERENCE TO RELATED APPLICATION

This application is a divisional application of U.S. application Ser. No. 09/918,150 filed Jul. 30, 2001 now U.S. PAT No. 7,013,267 and entitled "Method and Apparatus for Reconstructing Voice Information".

TECHNICAL FIELD OF THE INVENTION

The present invention relates generally to communications and more particularly to a method and apparatus for reconstructing voice information.

BACKGROUND OF THE INVENTION

Traditional circuit-switched communication networks have provided a variety of voice services to end users for many years. A recent trend delivers these voice services using networks that communicate voice information in packets. Packet networks communicate voice information between two or more endpoints in a communication session using a variety of routers, hubs, switches, or other packet-based equipment.

Sometimes these packet networks become congested or certain components fail, resulting in a loss of packets delivered to the destination. If the lost packets include voice samples, the user at the destination may detect a degradation in audio quality. Some attempts have been made to conceal packet loss at destination devices participating in a voice session, but these existing approaches require extensive processing performed at the destination.

SUMMARY OF THE INVENTION

In accordance with the present invention, techniques for reconstructing voice information communicated from a source to a destination are provided. In a particular embodiment, the present invention reconstructs voice information resulting from packet loss using a voice parameter communicated from a source.

In a particular embodiment of the present invention, an apparatus for reconstructing voice information communicated from a source includes an interface that receives first voice samples communicated from the source. The interface receives a voice parameter communicated from the source, the voice parameter characterizing the first voice samples. A processor determines a loss of a packet communicated from the source and generates second voice samples using the first samples and the voice parameter.

Embodiments of the present invention provide various technical advantages. Existing packet loss concealment techniques generate a voice parameter at the destination based on received voice samples. This processor-intensive activity becomes even more problematic when the destination receives packets from multiple sources. In one embodiment of the present invention, a source generates a voice parameter that characterizes voice information communicated from the source. The destination reconstructs voice information using this accurate and remotely-computed voice parameter. This reduces the processing requirements at the destination, provides a scalable packet loss concealment technique when the destination receives packets for multiple sources, and allows for accurate voice parameter calculations to be performed at the source.

Other technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
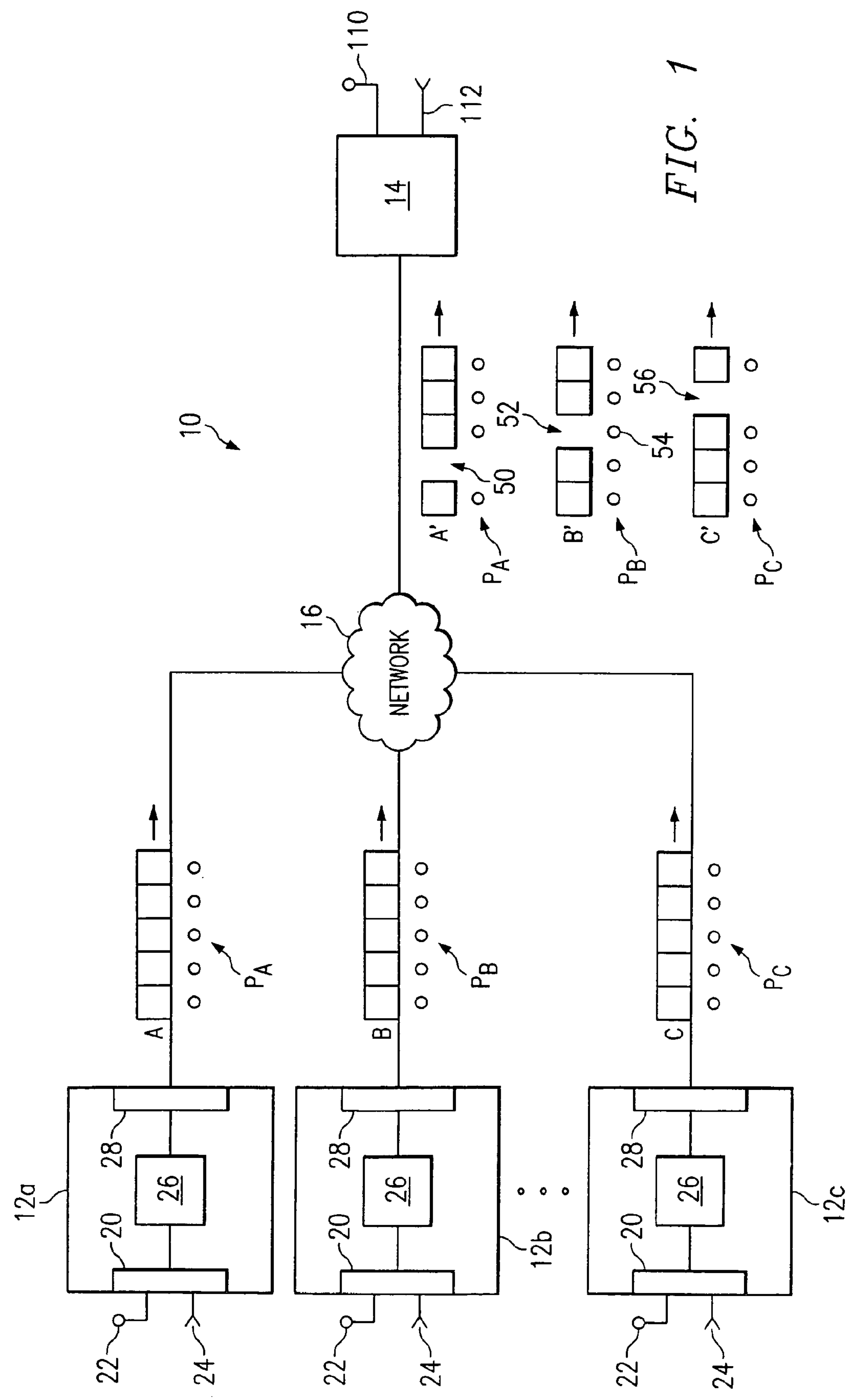
FIG. 1 illustrates a system that includes a destination that reconstructs voice information in accordance with the present invention.

FIG. 1 illustrates a communication system, indicated generally at 10, that includes a number of sources 12*a*, 12*b*, and 12*c* (generally referred to as sources 12) coupled to a destination 14 using a network 16. In general, sources 12 and destination 14 are endpoint or intermediate devices that engage in sessions to exchange voice, video, data, and other information (generally referred to as media). These sessions may be point-to-point involving one source 12 and one destination 14 or conferences among multiple sources 12 and destination 14. Whether exchanging information with one or more sources 12, destination 14 may reconstruct voice samples based on voice parameters calculated and communicated from sources 12.

Sources 12 and destination 14 (generally referred to as devices) include any suitable collection of hardware and/or software that provides communication services to a user. For example, devices may be a telephone, a computer running telephony software, a video monitor, a camera, or any other communication or processing hardware and/or software that supports the communication of media packets using network 16. Devices may also include unattended or automated systems, gateways, or other intermediate components that can establish media sessions. System 10 contemplates any number and arrangement of devices for communicating media. For example, the described technologies and techniques for establishing a communication session between two devices may be adapted to establish a conference between more than two devices.

Each device in system 10, depending on its configuration, processing capabilities, and other factors, supports certain communication protocols. For example, devices may include coders, processors, network interfaces, and other software and/or hardware that support the compression, decompression, communication and/or processing of media packets using network 16. Devices may support a variety of audio compression standards such as G.711, G.723, G.729, linear wide-band, or other audio standard and/or protocol (generally referred to as an audio format).

Each source 12 includes a user interface 20 coupled to a microphone 22 and a speaker 24. User interface 20 couples to a processor 26, which in turn couples to a network interface 28 that communicates media packets with network 16. Although source 12 may communicate any form of media in system 10, the following description will discuss the exemplary exchange of voice information in the form of packets.

Source 12 operates to both send and receive voice information. To send voice information, microphone 22 converts speech from a user of source 12 into an analog and/or digital signal communicated to user interface 20. Processor 26 then performs sampling, digitizing, conversion, packetizing, encoding, or any other appropriate processing of the signal to generate packets for communication to network 16 using network interface 28. In a particular embodiment, each packet contains multiple voice samples encoded and/or represented by a suitable audio format. To receive voice information, network interface 28 receives packets, and processor 26 performs decoding, demodulation, voice sample extraction, sampling, conversion, filtering, or any other appropriate processing on packets to generate a signal for communication to user interface 20 and speaker 24 for presentation to the user. Each source 12 communicates and receives a series of packets containing voice information using network 16. Any collection and/or sequence of packets may be referred to as a packet stream, whether communicated in real-time, near real-time, or a synchronously. This discussion will focus on packet streams communicated from sources 12 to destination 14 to illustrate the reconstruction of voice information at destination 14. However, system 10 contemplates bi-directional operation where sources 12 may also perform reconstruction on streams received from other devices in system 10.

Network 16 may be a local area network (LAN), wide area network (WAN), global distributed network such as the Internet, intranet, extranet, or any other form of wireless and/or wireline communication network. Generally, network 16 provides for the communication of packets, cells, frames, or other portion of information (generally referred to as packets) between sources 12 and destination 14. Network 16 may include any combination of routers, hubs, switches, and other hardware and/or software implementing any number of communication protocols that allow for the exchange of packets in system 10. In a particular embodiment, network 16 employs communication protocols that allow for the addressing or identification of sources 12 and destination 14 coupled to network 16. For example, using Internet protocol (IP), each of the components coupled by network 16 in communication system 10 may be identified in information directed using IP addresses. In this manner, network 16 may support any form and combination of point-to-point, multicast, unicast, or other techniques for exchanging media packets among components in system 10. Due to congestion, component failure, or other circumstance, source 12, destination 14, and/or network 16 may experience performance degradation while communicating packets in system 10. One potential result of performance degradation is packet loss, which may degrade the voice quality experienced by a user at destination 14.

In overall operation of system 10, sources 12 communicate packet streams to destination 14 using network 16. Specifically, source 12*a* converts speech received at microphone 22 into packet stream A for communication to network 16 using network interface 28. Similarly, source 12*b* communicates packet streams B and source 12*c* communicates packet stream C. Each packet stream communicated by sources 12 includes multiple packets, and each packet includes one or more voice samples in a suitable audio format that represents the speech signal converted by microphone 22. Although shown as a continuous sequence of packets, sources 12 contemplate communicating packets in any form or sequence to direct voice information to destination 14.

Sources 12 also generate and communicate at least one voice parameter (P) that characterizes voice samples contained in packets. For example, voice parameter P may comprise a pitch period, amplitude measure, frequency measure, or other parameter that characterizes voice samples contained in packets. In a particular embodiment, voice parameter P may include a pitch period that reflects an autocorrelation calculation performed at source 12 to determine a pitch of speech received at microphone 22. Source 12*a* generates voice parameters $P_A$, and similarly sources 12*b* and 12*c* generate voice parameters $P_B$ and $P_C$, respectively.

Sources 12 communicate voice parameters P in packets that contain voice samples or in separate packets, such as control packets. For example, source 12 may establish a control channel, such as a real-time control protocol (RTCP) channel, to convey voice parameter P from source 12 to destination 14. Although shown as including a voice parameter P for each packet communicated from source 12, system 10 contemplates voice parameters P sent for each voice sample, packet, every other packet, or in any other frequency that is suitable to allow destination 14 to use the voice parameter P to reconstruct voice information due to packet loss.

As discussed above, source 12, destination 14, and/or network 16 may experience performance degradation resulting in loss of one or more packets communicated from source 12 to destination 14. As illustrated, packet stream A' received at destination 14 from source 12*a* is missing the fourth packet and associated parameter $P_A$, as illustrated at position 50. Similarly, packet stream B' received from source 12*b* is missing a packet as indicated at position 52, but still contains voice parameter $P_B$ 54 associated with the lost packet. This is possible since source 12*b* may have communicated voice parameter $P_B$ 54 in a packet and/or dedicated control channel separate from lost packet 52 containing voice samples. Similarly, packet stream C' received from source 12*c* includes a corresponding lost packet and voice parameter at position 56. Although shown illustratively as one lost packet in a series of five packets, the degradation may be more severe where several packets in sequence do not arrive at destination 14 due to performance degradation of network 16. Destination 14 may then use voice parameters P to reconstruct voice information represented by lost packets. Destination 14 communicates the reconstructed voice information, containing successfully received voice samples and generated voice samples, to speaker 112 for presentation to a user.

Figure 2:
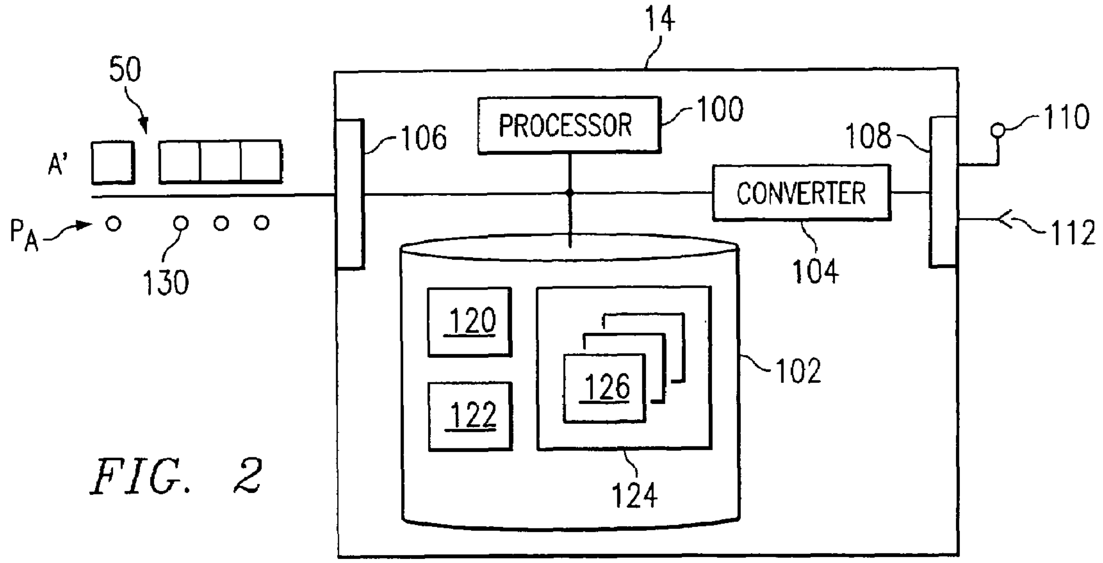
FIG. 2 is a block diagram illustrating exemplary components of the destination.

FIG. 2 illustrates in more detail destination 14, which includes a processor 100, memory 102, and converter 104. Destination 14 also includes a network interface 106 that receives packets containing voice samples and voice parameters from network 16. User interface 108 couples to a microphone 110 and speaker 112. Processor 100 may be a microprocessor, controller, digital signal processor (DSP), or any other suitable computing device or resource. Memory 102 may be any form of volatile or nonvolatile memory, including but not limited to magnetic media, optical media, random access memory (RAM), read-only memory (ROM), removable media, or any other suitable local or remote memory component. Converter 104 may be integral to or separate from processor 100 and may be a microprocessor, controller, DSP, or any other suitable computing device or resource that processes, transforms, or otherwise converts voice samples into a speech signal for presentation to speaker 112.

Memory 102 stores a program 120, voice parameters 122, and voice samples 124. Program 120 may be accessed by processor 100 to manage the overall operation and function of destination 14. Voice parameters 122 include voice parameters P received from one or more sources 12 and maintained, at least for some period of time, for reconstruction of voice information. Voice samples 124 represent voice information in a suitable audio format received in packets from source 12. Memory 102 may maintain one or more buffers 126 to order voice samples 124 in time and by source 12 to facilitate reconstruction of voice information. Memory 102 may maintain voice parameters 122 and voice samples 124 in any suitable arrangement and number of data structures to allow receipt, processing, reconstruction, and mixing of voice information from multiple sources 12.

In operation, destination 14 receives packet streams (A', B', C') and corresponding sets of voice parameters ($P_A$, $P_B$, $P_C$) from sources 12*a*, 12*b*, 12*c*. For purposes of discussion, FIG. 2 illustrates one packet stream A' and voice parameters $P_A$, but destination 14 can accommodate and similarly process any suitable number of packet streams. Network interface 106 receives packet stream A' and voice parameters $P_A$, and stores this information in memory 102 as voice samples 124 and associated voice parameters 122. Processor 100 implements any suitable communication protocol that performs decoding, segmentation, header and/or footer stripping, or other suitable processing on each received packet to retrieve voice samples 124. In a particular embodiment, each packet may be in the form of an IP packet which contains several voice samples in an appropriate audio format, such as G.711 or wide-band linear.

Memory 102 stores voice samples 124 in time sequence to allow for playout and reconstruction when packet loss occurs. Without packet loss, converter 104 receives sequenced voice samples 124 after a potential small delay introduced by storage in buffer 126, and converts this sampled voice information into a signal for communication to speaker 112 using user interface 108. Upon detection of a packet loss as represented by position 50 in packet stream A', processor 100 retrieves, for example, the most recently received voice parameter 130 and uses this information, along with previously received voice samples 124, to reconstruct voice information represented by the lost packet. This reconstruction of voice information combines generated voice samples with successfully received voice samples in buffer 126. Converter 104 receives voice samples 124 from buffer 126, and converts this information into an appropriate format for presentation to speaker 112.

The use of voice parameter 122 received from source 12 to reconstruct voice information reduces the processing requirements of processor 100. Since sources 12 generate and communicate voice parameters 122, processor 100 need not perform autocorrelation, filtering, or other signal analysis of received voice samples 124 to generate characterizing voice parameters 122. This, in turn, reduces the processing requirements for processor 100 and offers a scalable packet loss concealment technique for multiple voice streams received by destination 14. In addition, generating voice parameters 122 at source 12 ensures that voice parameters 122 properly characterize voice information generated by source 12 before packet loss occurs. In the particular example of packet stream A', calculation of voice parameter 122 based on received voice samples may be less accurate due to the packet loss condition.

Figure 3:
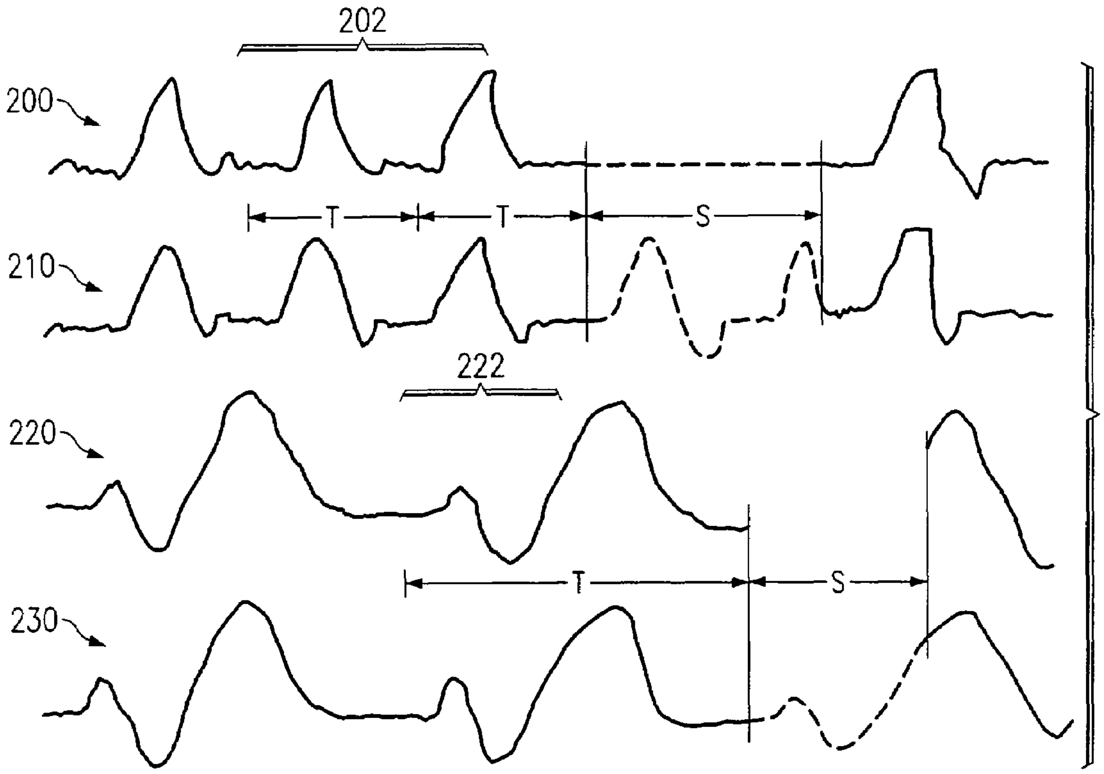
FIG. 3 includes waveforms that illustrate an exemplary packet loss concealment technique.

FIG. 3 illustrates audio waveforms represented by received and generated voice samples 124 maintained in buffer 126 of memory 102. Each waveform includes a number of voice samples encoded in a particular audio format, communicated through network 16, and converted into a suitable format for presentation to speaker 112.

Waveform 200 represents voice samples received by destination 14 from source 12. A silence interval (S) in waveform 200 represents a packet loss due to performance degradation in network 16. Packet loss concealment techniques attempt to recreate this portion of waveform 200 in buffer 126 so that playout of waveform 200 using converter 104, user interface 108, and speaker 112 presents an audio signal that effectively conceals the packet loss condition to the user. In addition to voice samples 124 that represent waveform 200, destination 14 also receives voice parameter 122, which for this example is a pitch period (T) of voice information as calculated by source 12. Source 12 generates the value for pitch period T using, for example, an autocorrelation function performed on temporally relevant voice samples generated by source 12. Source 12 communicates the value for pitch period T in either packets that communicate voice samples 124 or separate packets, such as an RTCP control packet. Using the determined silence interval S and the received pitch period T, processor 100 retrieves a selected portion 202 of waveform 200 to copy into silence interval S. In this particular embodiment, the start point of portion 202 is one or more integer pitch periods before the beginning of silence interval S. The length of portion 202 corresponds approximately to silence interval S.

Reconstructed waveform 202 includes both successfully received voice samples (represented by the solid trace), as well as generated voice samples to fill the silence interval S (represented by the dashed trace) to maximize the packet loss concealment and audio reproduction to the user. In one embodiment, processor 100 adjusts generated voice samples to smooth transitions with successfully received voice samples. In addition, if generated voice samples repeat due to an extended silence interval S, processor 100 may apply an attenuation factor that increases with each subsequent lost packet.

Waveform 220 represents another example of a lost packet condition where silence interval S is shorter than pitch period T specified in voice parameter 122 generated and communicated from source 12. In this case, a portion 222 of received voice samples used to reconstruct silence interval S begins one pitch period T before the beginning of silence interval S and continues partially into pitch period T for the approximate length of silence interval S. Reconstructed waveform 230 includes both received voice samples (solid trace) and generated voice samples (dashed trace) maintained in buffer 126 of memory 102.

Figure 4:
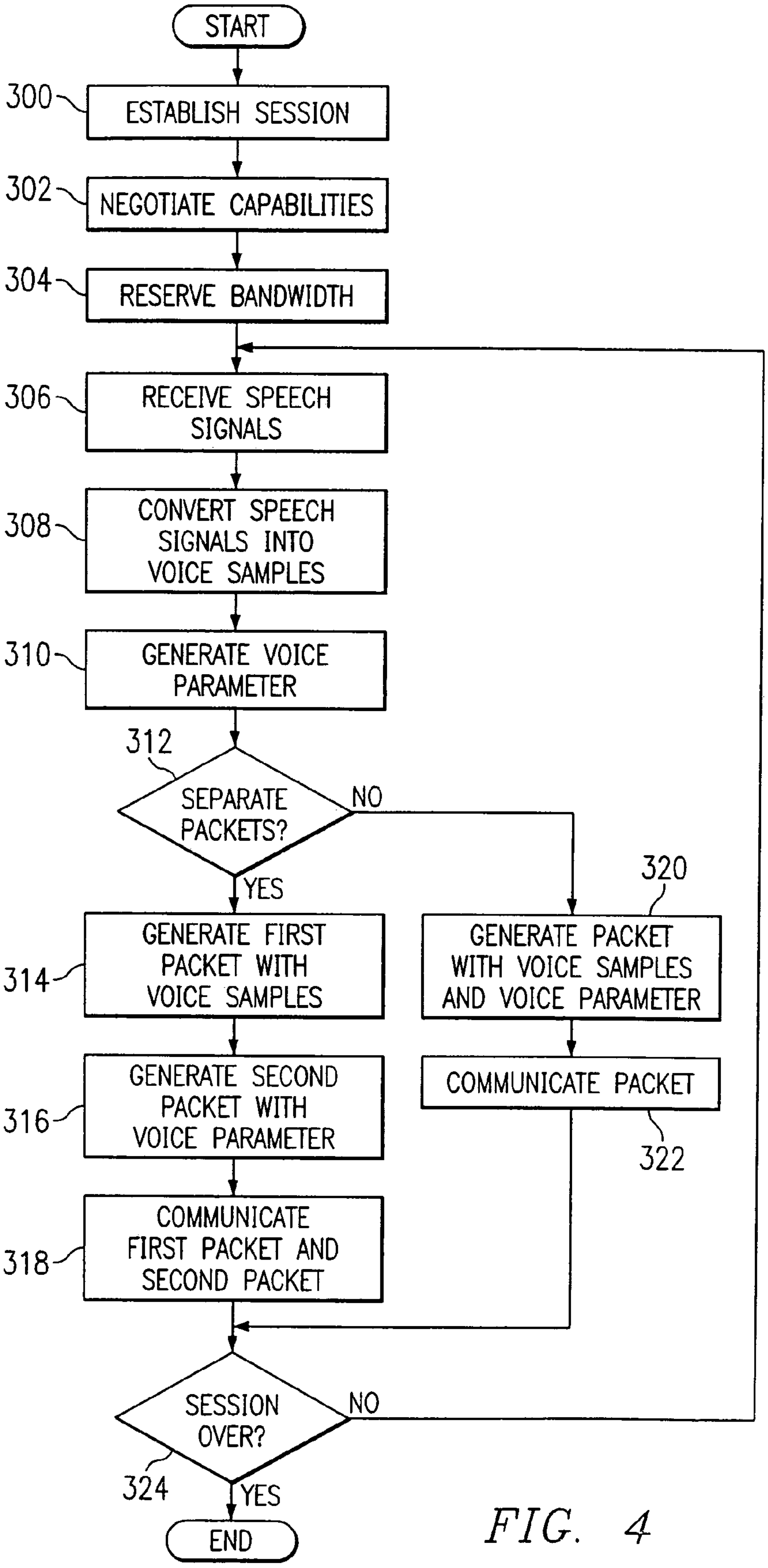
FIG. 4 is a flow chart illustrating a method performed at a source to generate and communicate voice samples and a voice parameter.

FIG. 4 is a flow chart of a method performed at source 12 to generate and communicate packets containing voice samples 124 and voice parameters 122. The method begins at step 300 where source 12 establishes a session with destination 14 using network 16. This session may involve the exchange of any form of media using any suitable communication protocol, but the particular embodiment described involves the exchange of voice information. The session may be a point-to-point communication with destination 14 or may include a number of other sources 12 participating in a conference call. Source 12 negotiates at least one communication capability with destination 14 at step 302. This may include the negotiation of communication protocols, audio format, or other capabilities that allow for the exchange of voice information between components. Based, at least in part, on the negotiated capabilities from step 302, source 12 may reserve appropriate bandwidth supplied by network 16 at step 304. All, some, or none of steps 300-304 may be performed in any particular order to allow source 12 to identify a destination 14 for packets containing voice information.

Source 12 receives speech signals from microphone 22 at step 306, and converts these speech signals into voice samples at step 308 using processor 26. For example, these voice samples may be converted into any appropriate audio format, such as G.711, G.723, G.729, linear wide-band, or any other suitable audio format. Processor 26 also generates a voice parameter that characterizes the voice samples at step 310. The voice parameter may be a pitch period, magnitude measure, frequency measure, or any other parameter that characterizes the spectral and/or temporal content of voice samples. In a particular embodiment, processor 26 generates a pitch period for the voice samples using a suitable autocorrelation function.

Source 12 determines whether the voice samples and voice parameter will be sent in the same or separate packets at step 312. For example, the session established at step 300 may include both a media channel, such as a real-time protocol (RTP) channel, as well as a control channel, such as a real-time control protocol (RTCP) channel. If the voice samples and voice parameter are to be communicated in separate packets, then source 12 generates a first packet with the voice samples at step 314 and a second packet with the voice parameter at step 316. Using network interface 28, source 12 communicates the first and second packets at step 318. If the voice samples and voice parameter are not to be communicated in separate packets, source 12 generates a packet with the voice samples and voice parameter at step 320, and communicates the packet at step 322. If the session is not over as determined at step 324, then the process repeats beginning at step 306 to generate additional packets containing voice samples and voice parameters. If the session is over as determined at step 324, then the method ends.

Figure 5:
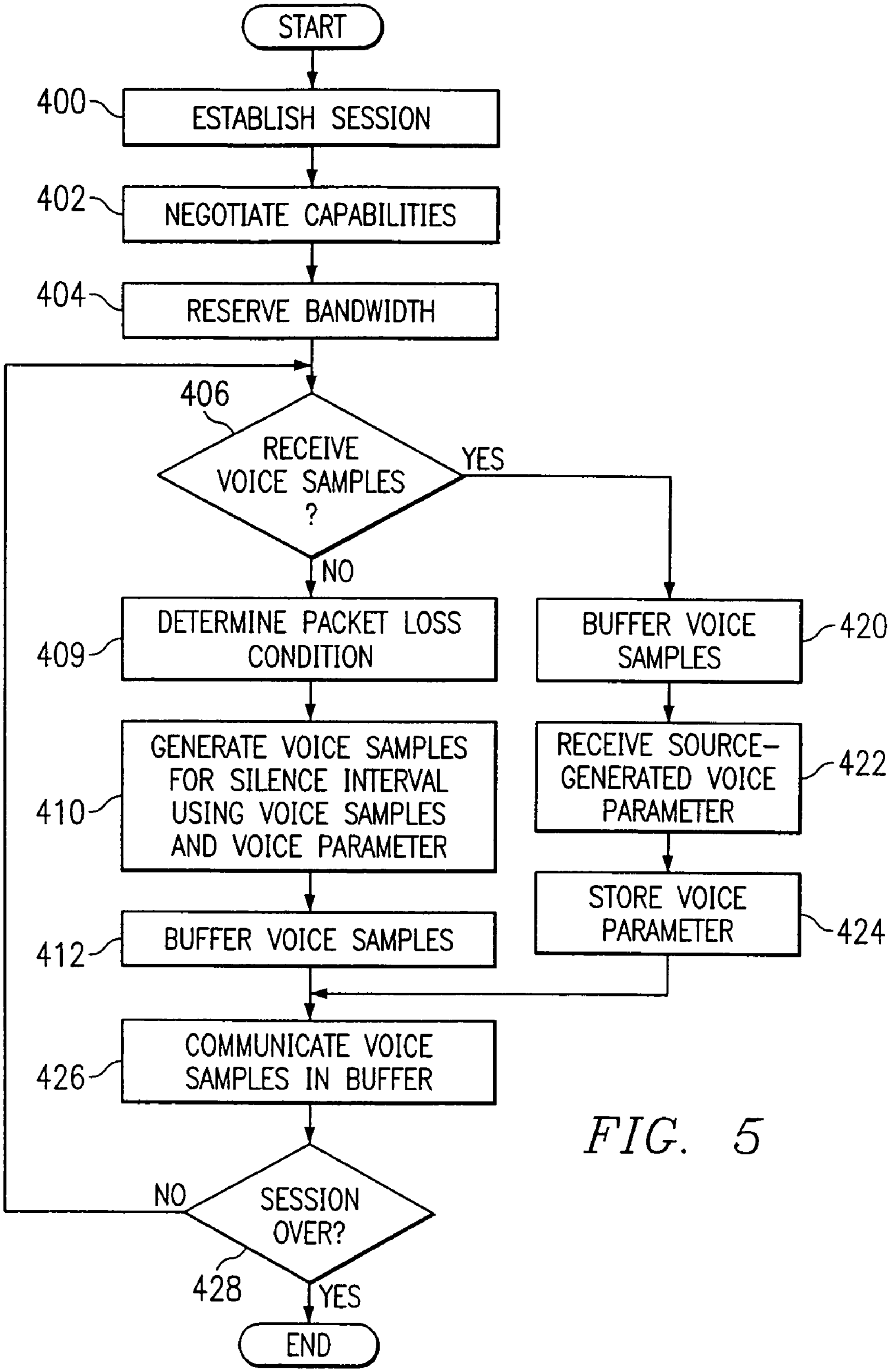
FIG. 5 is a flow chart illustrating a method performed at the destination for reconstructing voice samples.

FIG. 5 is a flow chart of a method performed at destination 14 to reconstruct voice information when packets are lost due to performance degradation of source 12, destination 14, and/or network 16. The method begins at step 400 where destination 14 establishes a session with one or more sources 12 using network 16. Each session may involve the exchange of any form of media using any suitable communication protocol, but the particular embodiment described involves the exchange of voice information. The session may be a point-to-point communication with a single source 12 or may include a number of other sources 12 participating in a conference call. Destination 14 may negotiate at least one communication capability with each participating source 12 at step 402. This may include the negotiation of communication protocols, audio format, or other capabilities that allow for the exchange of voice information between components. Based, at least in part, on the negotiated capabilities from step 402, destination 14 may reserve appropriate bandwidth supplied by network 16 at step 404. All, some, or none of steps 400-404 may be performed in any particular order and in association with or as a replacement to steps 300-304 of FIG. 4 to establish sessions between destination 14 and one or more sources 12.

Destination 14 supports the receipt and reconstruction of voice samples from multiple sources 12. For clarity, FIG. 5 illustrates the logic and flow to receive voice information from a single source 12, but this same methodology may be performed by destination 14 in parallel or sequence to support any number of sources 12 in a conference call or other collaborative environment. For each participating source 12, destination 14 determines whether it has received any voice samples at step 406. If no voice samples are received at step 406, destination 14 determines a packet loss condition at step 409. Upon determining a loss of a packet, destination 14 generates voice samples for the silence interval at step 410 using previously received voice samples 124 and voice parameter 122. Destination 14 stores generated voice samples 124 in buffer 126 of memory 122 at step 412.

If destination 14 receives voice samples at step 406, destination 14 stores received voice samples 124 in buffer 126 of memory 102 at step 420. Destination 14 receives voice parameter 122 generated by source 12 at step 422, and stores voice parameter 122 in memory 102 at step 424. As described above, destination 14 may receive voice parameter 122 in the same packet carrying voice samples 124 or in a different packet, and may receive voice parameter 122 at any suitable frequency or interval.

In parallel and/or sequence to receiving and/or generating voice samples 124, destination 14 communicates voice samples 124 maintained in buffer 126 of memory 102 for playout to the user at step 426. Playout may include conversion of voice samples by converter 104 for presentation to speaker 112 using user interface 108. In addition, processor 100 may mix received and generated voice samples 124 from multiple sources 12 into a mixed signal for presentation to the user using converter 104, user interface 108, and speaker 112. Since processor 100 receives voice parameters 122 generated and communicated from sources 12, the processing requirements to reconstruct voice information for lost packets is reduced. If the session is not over, as determined at step 428, the process continues at step 406 where destination 14 determines whether it has received additional voice samples 124. If the session is over at step 428, the method ends.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is the claimed is:

1. A method for reconstructing voice information communicated from a source to a destination, comprising the following steps performed at the destination:
- receiving a plurality of first voice samples communicated from a source;
- receiving a voice parameter communicated from the source, the voice parameter characterizing the first voice samples and the voice parameter comprising a pitch period, wherein the voice parameter is received in a first packet and the first voice samples are received in a second packet separate from the first packet;
- determining a loss of a packet communicated from the source; and
- generating a plurality of second voice samples using the first voice samples and the voice parameter, wherein generating the second voice samples comprises:
  - determining a silence interval represented by the packet loss;
  - determining a start point in a buffer storing the first voice samples that is one or more integer pitch periods before the beginning of the silence interval; and
- copying first voice samples from the buffer beginning at the start point to generate the second voice samples associated with the silence interval.

2. The method of claim 1, further comprising: converting the first and second voice samples into a speech signal; and presenting the speech signal to a user.

3. The method of claim 1, wherein the voice parameter comprises a pitch period that reflects an autocorrelation calculation performed at the source to determine a pitch of a speech signal.

4. The method of claim 1, wherein the first voice samples comprise a selected one of a G.711 audio format and a linear audio format.

5. The method of claim 1, wherein generating a plurality of second voice samples uses an attenuation factor that increases with each subsequent packet loss.

6. The method of claim 1, further comprising the following steps performed before receiving the first voice samples:

negotiating at least one communication capability with the source; and reserving suitable bandwidth to conduct a voice session based on the negotiated capability.

7. An apparatus for reconstructing voice information communicated from a source, the apparatus comprising:

an interface operable to receive a plurality of first voice samples communicated from a source, the interface further operable to receive a voice parameter communicated from the source, the voice parameter characterizing the first voice samples and the voice parameter comprising a pitch period, wherein the interface is operable to receive the voice parameter in a first packet and receive the first voice samples in a second packet separate from the first packet;

a memory operable to store the first voice samples;

a processor operable to determine a loss of a packet communicated from the source, the processor further operable to generate a plurality of second voice samples using the first voice samples and the voice parameter, wherein the processor determines a silence interval represented by the packet loss and determines a start point in the memory that is one or more integer pitch periods before the beginning of the silence interval, the processor further operable to copy first voice samples from the memory beginning at the start point to generate the second voice samples associated with the silence interval;

a converter operable to convert the first and second voice samples into a speech signal; and a speaker operable to communicate the speech signal to a user.

8. The apparatus of claim 7, wherein the voice parameter comprises a pitch period that reflects an autocorrelation calculation performed at the source to determine a pitch of a speech signal.

9. The apparatus of claim 7, wherein the first voice samples comprise a selected one of a G.711 audio format and a linear audio format.

10. The apparatus of claim 7, wherein the processor is operable to generate the second voice samples using an attenuation factor that increases with each subsequent packet loss.

11. The apparatus of claim 7, further comprising a converter to receive the voice samples and to generate a speech signal for communication to a speaker for output to a user.

12. The apparatus of claim 7, wherein the voice parameter comprises a pitch period that reflects an autocorrelation calculation performed at the source to determine a pitch of a speech signal.

13. The apparatus of claim 7, wherein the first voice samples comprise a selected one of a G.711 audio format and a linear audio format.

14. The apparatus of claim 7, wherein the processor is operable to generate the second voice samples using an attenuation factor that increases with each subsequent packet loss.

15. The apparatus of claim 7, wherein the voice parameter comprises a pitch period, the apparatus further comprising:

a memory operable to store the first voice samples; and wherein the processor determines a silence interval represented by the packet loss and determines a start point in the memory that is one or more integer pitch periods before the beginning of the silence interval, the processor further operable to copy first voice samples from the memory beginning at the start point to generate the second voice samples associated with the silence interval.

16. The apparatus of claim 7, further comprising a converter to receive the voice samples and to generate a speech signal for communication to a speaker for output to a user.

17. An apparatus for reconstructing voice information communicated from a plurality of sources, the apparatus comprising:

an interface operable to receive, for each of the sources, a plurality of first voice samples generated at the corresponding source, the interface further operable to receive, for each of the sources, a voice parameter communicated from the corresponding source, each voice parameter characterizing the first voice samples generated at the corresponding source and the voice parameter comprising a pitch period, wherein the interface is operable to receive each voice parameter in a first packet and receive the first voice samples in a second packet separate from the first packet;

a memory operable to store the first voice samples; and a processor operable to determine, for each of the sources, whether a loss of a packet communicated from the corresponding source has occurred, the processor further operable to generate, for each of the sources having a packet loss, a plurality of second voice samples using previously received first voice samples and the voice parameter generated at the corresponding source, wherein the processor determines a silence interval represented by the packet loss and determines a start point in the memory storing the first voice samples that is one or more integer pitch periods before the beginning of the silence interval, the processor further operable to copy first voice samples from the memory beginning at the start point to generate the second voice samples associated with the silence interval.

18. The apparatus of claim 17, wherein the voice parameter comprises a pitch period that reflects an autocorrelation calculation performed at the corresponding source to determine a pitch of a speech signal.

19. The apparatus of claim 17, wherein the first voice samples comprise a selected one of a G.711 audio format and a linear audio format.

20. The apparatus of claim 17, wherein the processor is operable to generate the second voice samples using an attenuation factor that increases with each subsequent packet loss.

21. The apparatus of claim 17, wherein the processor is further operable to mix the first and second voice samples from more than one of the sources to generate a mixed signal, and further comprising:

a converter operable to convert the mixed signal into a speech signal; and a speaker operable to communicate the speech signal to a user.

22. The apparatus of claim 17, wherein the voice parameter comprises a pitch period that reflects an autocorrelation calculation performed at the corresponding source to determine a pitch of a speech signal.

23. The apparatus of claim 17, wherein the first voice samples comprise a selected one of a G.711 audio format and a linear audio format.

24. The apparatus of claim 17, wherein the processor is operable to generate the second voice samples using an attenuation factor that increases with each subsequent packet loss.

25. The apparatus of claim 17, wherein the voice parameter comprises a pitch period, the apparatus further comprising:

a memory operable to store the first voice samples; and wherein the processor determines a silence interval represented by the packet loss and determines a start point in the memory storing the first voice samples that is one or more integer pitch periods before the beginning of the silence interval, the processor further operable to copy first voice samples from the memory beginning at the start point to generate the sccond voice samples associated with the silence interval.

26. The apparatus of claim 17, wherein the processor is further operable to mix the first and second voice samples from more than one of the sources to generate a mixed signal, and further comprising:

a converter operable to convert the mixed signal into a speech signal; and a speaker operable to communicate the speech signal to a user.

27. A computer readable medium recording logic for reconstructing voice information communicated from a source to a destination, the logic operable to:

receive a plurality of first voice samples communicated from a source;

receive a voice parameter communicated from the source, the voice parameter characterizing the first voice samples and the voice parameter comprising a pitch period, wherein the logic is operable to receive the voice parameter in a first packet and receive the first voice samples in a second packet separate from the first packet;

determine a loss of a packet communicated from the source;

generate a plurality of second voice samples using the first voice samples and the voice parameter;

determine a silence interval represented by the packet loss;

determine a start point in a buffer storing the first voice samples that is one or more integer pitch periods before the beginning of the silence interval; and copy first voice samples from the buffer beginning at the start point to generate the second voice samples associated with the silence interval.

28. A method for reconstructing voice information communicated from a plurality of sources to a destination, the method comprising the following steps performed at the destination:

receiving, for each of the sources, a plurality of first voice samples generated at the corresponding source;

receiving, for each of the sources, a voice parameter communicated from the corresponding source, each voice parameter characterizing the first voice samples generated at the corresponding source and each voice parameter comprising a pitch period, wherein each voice parameter is received in a first packet and the first voice samples are received in a second packet separate from the first packet;

determining, for each of the sources, whether a loss of a packet communicated from the corresponding source has occurred; and generating, for each of the sources having a packet loss, a plurality of second voice samples using previously received first voice samples and the voice parameter generated at the corresponding source, wherein generating the second voice samples comprises:

determining a silence interval represented by the packet loss;

determining a start point in a buffer storing the first voice samples that is one or more integer pitch periods before the beginning of the silence interval; and copying first voice samples from the buffer beginning at the start point to generate the second voice samples associated with the silence interval.

29. The method of claim 28, wherein the voice parameter comprises a pitch period that reflects an autocorrelation calculation performed at the corresponding source to determine a pitch of a speech signal.

30. The method of claim 28, wherein the first voice samples comprise a selected one of a G.711 audio format and a linear audio format.

31. The method of claim 28, wherein generating a plurality of second voice samples uses an attenuation factor that increases with each subsequent packet loss.

32. The method of claim 28, further comprising:

mixing first and second voice samples from more than one of the sources to generate a mixed signal;

converting the mixed signal into a speech signal; and presenting the speech signal to a user.

33. The method of claim 28, further comprising the following steps performed before receiving the first voice samples:

negotiating, for each of the sources, at least one communication capability; and reserving, for each of the sources, suitable bandwidth to conduct a voice session with the corresponding source based on the negotiated capability.

* * * * *